(12) United States Patent
Iivonen et al.

(10) Patent No.: US 6,910,043 B2
(45) Date of Patent: Jun. 21, 2005

(54) COMPRESSION OF NODES IN A TRIE STRUCTURE

(75) Inventors: Jukka-Pekka Iivonen, Helsinki (FI); Matti Tikkanen, Espoo (FI)

(73) Assignee: Nokia Corporation, Espoo (FI)

( * ) Notice: Subject to any disclaimer, the term of this patent is extended or adjusted under 35 U.S.C. 154(b) by 852 days.

(21) Appl. No.: 09/819,022

(22) Filed: Mar. 26, 2001

(65) Prior Publication Data

US 2001/0042186 A1 Nov. 15, 2001

Related U.S. Application Data

(63) Continuation of application No. PCT/FI99/00717, filed on Sep. 2, 1999.

(30) Foreign Application Priority Data

Sep. 29, 1998 (FI) .................................................. 982095

(51) Int. Cl.$^7$ ........................... G06F 7/00; G06F 17/00; G06F 17/30; G06F 12/00
(52) U.S. Cl. ........................... 707/101; 707/205; 707/3
(58) Field of Search .............................. 707/1–10, 100, 707/102, 202, 205, 101

(56) References Cited

U.S. PATENT DOCUMENTS

| | | | | |
|---|---|---|---|---|
| 5,276,868 A | * | 1/1994 | Poole ............................. | 707/3 |
| 5,592,667 A | * | 1/1997 | Bugajski ...................... | 707/102 |
| 5,684,976 A | * | 11/1997 | Soheili-Arasi et al. ....... | 711/128 |
| 5,721,899 A | * | 2/1998 | Namba ........................... | 707/3 |
| 5,787,430 A | * | 7/1998 | Doeringer et al. ........... | 707/100 |
| 5,829,004 A | * | 10/1998 | Au ................................. | 707/100 |
| 5,848,416 A | * | 12/1998 | Tikkanen ..................... | 707/101 |

FOREIGN PATENT DOCUMENTS

| | | |
|---|---|---|
| WO | WO 95/34155 | 12/1995 |
| WO | WO 98/41932 | 9/1998 |

OTHER PUBLICATIONS

International Search Report for PCT/FI99/00717.

\* cited by examiner

*Primary Examiner*—Frantz Coby
*Assistant Examiner*—Merilyn Nguyen
(74) *Attorney, Agent, or Firm*—Squire, Sanders & Dempsey L.L.P.

(57) ABSTRACT

The invention relates to a method for implementing a functional memory and to a memory arrangement. The memory is implemented as a directory structure comprising a tree-shaped hierarchy having nodes at several different hierarchy levels, wherein an individual node can be (i) a trie node associated with a logical table wherein an individual element may contain a pointer pointing to a lower node in the hierarchy, or (ii) a bucket containing at least one element so that the type of an individual element in the bucket is selected from a group including of e.g. a data unit or a pointer to a stored data unit. To optimize the performance of the functional trie structure, the trie nodes are implemented as quad nodes of four elements, and in at least part of the directory structure groups of successive quad nodes are replaced by compressed nodes in such a way that (a) an individual group comprising a given quad node and its child nodes is replaced by a node whose logical table has 16 elements, and (b) a compressed node known per se is formed from said node of 16 elements by physically storing in the node only non-nil pointers and in addition a bit pattern on the basis of which the physical storage location in the node, corresponding to the search word, can be determined. The invention also relates to a structure in which no buckets are used.

30 Claims, 3 Drawing Sheets

COMPRESSION OF NODES IN A TRIE STRUCTURE

This application is a continuation of PCT/FI99/00717 Sep. 2, 1999.

FIELD OF THE INVENTION

The present invention generally relates to implementation of a memory. More specifically, the invention is intended to be used in connection with all memories based on a functional digital trie structure. However, the solution is mainly intended for central memory databases. A functional structure denotes a memory in which updates, such as additions, are carried out in such a way that the path from the root to the point of addition is first copied, and the addition is made to the copied data (the addition is not made directly to the existing data). Such an updating procedure is also called by the term "copy-on-write".

BACKGROUND OF THE INVENTION

The prior art unidimensional directory structure termed digital trie (the word "trie" is derived from the English word "retrieval") is the underlying basis of the principle of the present invention. Digital tries can be implemented in two types: bucket tries, and tries having no buckets.

A bucket digital trie structure is a tree-shaped structure composed of two types of nodes: buckets and trie nodes. At this stage, a data structure that can accommodate a number of data units or a number of pointers to data units or a number of search key/data unit pairs or a number of search key/pointer pairs is termed a bucket. A maximum size greater than one has been defined for said number. However, a bucket can contain a smaller number than said maximum number of data units, pointers, or key/pointer pairs, in which case the bucket is not full. A trie node, on the other hand, is an array guiding the retrieval, having a size of two by the power of k ($2^k$) elements. If an element in a trie node is in use, it refers either to a trie node at the next level in the directory tree or to a bucket. In other cases, the element is free (empty).

Search in the database proceeds by examining the search key (which in the case of a subscriber database in a mobile telephone network or a telephone exchange, for instance, is typically the binary numeral corresponding to the telephone number of the subscriber) k bits at a time. The bits to be searched are selected in such a way that at the root level of the structure (in the first trie node), k leftmost bits are searched; at the second level of the structure, k bits next to the leftmost bits are searched, etc. The bits to be searched are interpreted as an unsigned binary integer that is employed directly to index the element table contained in the trie node, the index indicating a given element in the table. If the element indicated by the index is free, the search will terminate as unsuccessful. If the element refers to a trie node at the next level, k next bits extracted from the search key are searched at that level in the manner described above. As a result of comparison, the routine branches off in the trie node either to a trie node at the next level or to a bucket. If the element refers to a bucket containing a key, the key stored therein is compared with the search key. The entire search key is thus compared only after the search has encountered a bucket. Where the keys are equal, the search is successful, and the desired data unit is obtained at the storage address indicated by the pointer of the bucket. Where the keys differ, the search terminates as unsuccessful.

A bucketless trie structure has no buckets, but a leaf node containing only one element that can be a data unit, a pointer to a data unit, a search key/data unit pair or a search key/pointer pair, corresponds to a bucket. In the present context, the nodes above the leaf nodes in the bucketless trie structure are called internal nodes. In a bucketless digital trie structure, the nodes are thus either internal nodes or leaf nodes. By means of buckets, the need for reorganizing the directory structure can be postponed, as a large number of pointers, data units, search key/data unit pairs or search key/pointer pairs can be accommodated in the buckets until a time when the need for reorganization arises.

The solution in accordance with the invention can be applied to a bucket structure as well as a bucketless structure. In the following, bucket structures will be used as examples, since also the bucketless trie structure can easily be understood by means of them.

Figure 1:
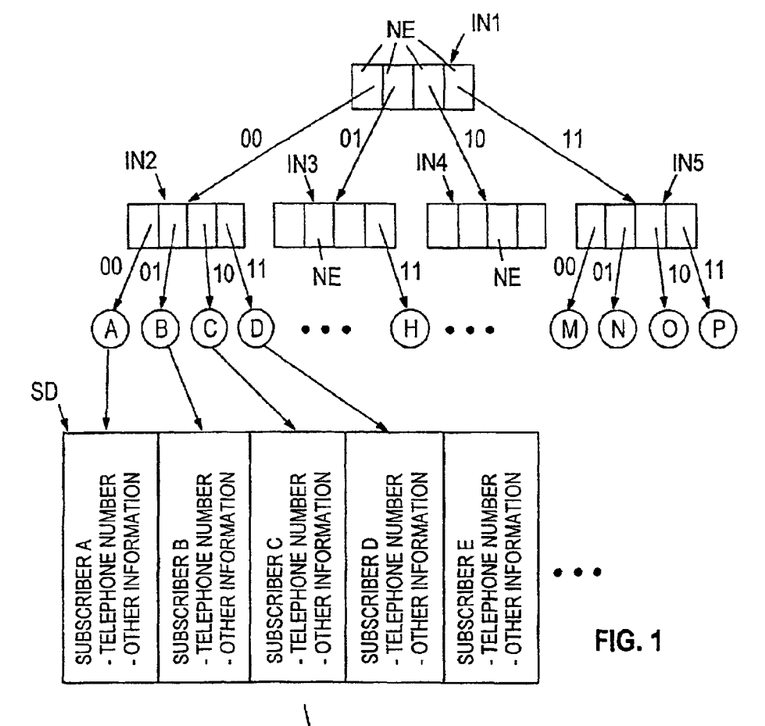
FIG. 1 illustrates the use of a unidimensional digital trie structure in the maintenance of subscriber data in a telephone exchange.

FIG. 1 shows an example of a digital trie structure in which the key has a length of 4 bits and k=2, and thus each trie node has $2^2=4$ elements, and two bits extracted from the key are searched at each level. Buckets are denoted with references A, B, C, D . . . H . . . M, N, O and P. Thus a bucket is a node that does not point to a lower level in the tree. Trie nodes are denoted with references IN1 . . . IN5 and elements in the trie node with reference NE in FIG. 1.

In the exemplary case of FIG. 1, the search keys for the buckets shown are as follows: A=0000, B=0001, C=0010, . . . , H=0111, . . . and P=1111. In this case, a pointer is stored in each bucket to that storage location in the database SD at which the actual data, e.g. the telephone number of the pertinent subscriber and other information relating to that subscriber, is to be found. The actual subscriber data may be stored in the database for instance as a sequential file of the type shown in the figure. The search is performed on the basis of the search key of record H, for example, by first extracting from the search key the two leftmost bits (01) and interpreting them, which delivers the second element of node IN1, containing a pointer to node IN3 at the next level. At this level, the two next bits (11) are extracted from the search key, thus yielding the fourth element of that node, pointing to record H.

Instead of a pointer, a bucket may contain (besides a search key) an actual data record (also called by the more generic term data unit). Thus for example the data relating to subscriber A (FIG. 1) may be located in bucket A, the data relating to subscriber B in bucket B, etc. Thus in one embodiment of the memory, a key-pointer pair is stored in the bucket, and in another embodiment a key and actual data are stored, even though the key is not indispensable. In this respect, the different alternative embodiments will be described in detail hereinafter.

The search key may also be multidimensional. In other words, the search key may comprise a number of attributes (for example the family name and one or more surnames of a subscriber). Such a multidimensional trie structure is disclosed in international application No. PCT/FI95/00319 (published under number WO 95/34155). In said structure, address computation is performed in such a way that a given predetermined number of bits at a time is selected from each dimension independently of the other dimensions. Hence, a fixed limit independent of the other dimensions is set for each dimension in any individual node of the trie structure, by predetermining the number of search key bits to be searched in each dimension. With such a structure, the need for memory circuit requirement can be curbed when the distribution of the values of the search keys is known in advance, in which case the structure can be implemented in a static form.

If the possibility of reorganizing the structure in accordance with the current key distribution to be optimal in terms of efficiency and storage space occupancy is desired, the size of the nodes must vary dynamically as the key distribution changes. When the key distribution is even, the node size may be increased to make the structure flatter (a flatter structure entails faster retrievals). On the other hand, with uneven key distributions in connection with which storage space occupancy will present a problem in memory structures employing dynamic node size, the node size can be maintained small, which will enable locally a more even key distribution and thereby smaller storage space occupancy. Dynamic changes of node size require the address computation to be implemented in such a way that in each node of the tree-shaped hierarchy constituted by the digital trie structure, a node-specific number of bits is selected from the bit string constituted by the search keys used. Dynamic reorganizing of the nodes naturally requires part of the processing capacity.

The choice between a fixed node size and a dynamically changing node size is dependent for example on what type of application the memory is intended for, e.g. what the number of database searches, insertions and deletions is and what the proportions of said operations are.

The efficiency and performance of the memory are thus influenced, among other things, by the storage space required by the trie structure and the depth of the trie structure. In a functional digital trie structure, in which the entire search path from the root to the point of updating has to be copied in connection with updates, the performance of the memory is also influenced by how many words to be copied such a path contains. Thus, if compression is performed in the memory, this should be done in such a way that the quantity of data to be copied does not increase as a result of compression to such an extent as to impair the performance of the memory.

Hence, the problem with a functional trie structure is how compression should be carried out in the structure in order for the memory performance to be as good as possible, observing all the above factors.

SUMMARY OF THE INVENTION

It is an object of the present invention to provide a solution to the problem described above. This object is achieved with the method defined in the independent claims. Some of these relate to a structure employing buckets and some to a bucketless structure.

The idea of the invention is to perform compression in a trie structure having nodes containing four elements (=quad nodes) in such a way that the quad node and its child nodes are first replaced by one node of size 16 and thereafter this node is compressed in such a way that only non-nil pointer values are physically stored in the node. In this connection, for example a bit pattern or bit chart indicating the physical storage location in the node, corresponding to the search word used in the compressed node, is stored in the node. The bit pattern represents the standard-length element table (16 indices) of the node as the table indicating the physical storage locations in the node.

Thus, in the method level compression is first performed on successive quad nodes in the depth direction; in this compression, one new node is formed from the quad node and its child nodes, having an element table of 16 elements. Thereafter, a further compression in the width direction is performed on this node by deleting the nil pointers from the node. This takes place in such a manner that only non-nil pointers are physically stored in the node, and instead of nil pointers the above bit chart or pattern is stored. The width compression can be performed in a fully known manner or by varying known principles.

When the solution in accordance with the invention is used, the depth and storage space occupancy of the functional structure can be diminished without that the number of words to be copied in connection with updates will essentially increase on account of the compression, and thereby diminish the performance advantage to be gained from the reduced depth and storage space occupancy.

In order for the memory performance to remain optimum all the time, it is preferable to set a given maximum capacity for a compressed node, and when this maximum capacity is exceeded the node is again reduced to a quad node and its child nodes. Hence, it is not worth-while to perform compression if the quad node has too many child nodes or grandchild nodes. Compression can, for example, be performed only on groups of nodes in which a quad node has two child nodes or on groups in which a quad node has eight grandchild nodes at most (in which case the number of child nodes can also be three or four).

BRIEF DESCRIPTION OF THE DRAWINGS

In the following the invention and its preferred embodiments will be described in closer detail with reference to examples in accordance with the accompanying drawings, in which.

DETAILED DESCRIPTION OF THE INVENTION

In order for it to be possible to achieve an optimum combination in view of memory retrievals, storage space occupancy and copying performed in connection with updates, compression is performed in the trie structure in such a way that one compressed node is formed from the quad node and its child nodes by first replacing the quad node and its child nodes by one node of size 16, which is followed by compression of the new node in which all nil pointers are deleted therefrom. This latter compression can be performed in a known manner, as will be described hereinafter.

The selection of a quad node as the node size to be used in the structure is an essential condition for maximum benefit to be gained from the method of the invention in a functional structure. It can namely be shown that the average storage space occupancy of trie nodes in an n-ary trie (with even key distributions) have minima at values n=2 and n=4. When the value n=4 is selected from these values, the depth of the structure will be as small as possible and furthermore the compression can be effectively performed (in a large part of the memory), so that the number of words to be copied in connection with updates will not be too great on account of the compression as compared to a non-compressed situation.

Figure 2:
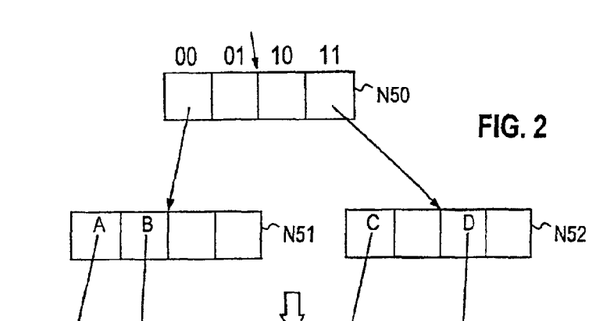
FIG. 2 shows a group of quad nodes to which the method of the invention is applied.
Figure 3:
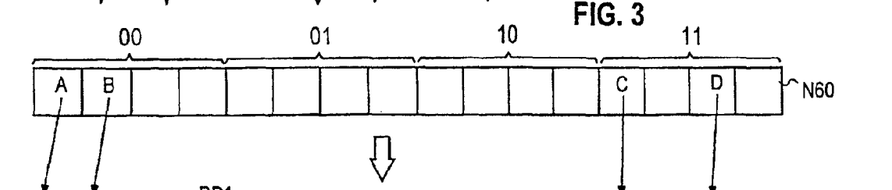
FIG. 3 shows a node having 16 elements, replacing the group of nodes in accordance with FIG. 2.
Figure 4:
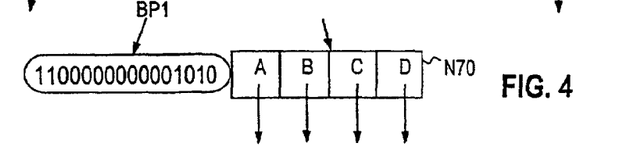
FIG. 4 shows the node of FIG. 3 compressed.

The procedure in accordance with the invention will be described in the following with reference to the compression example shown in FIGS. 2 ... 4. FIG. 2 shows a quad node N50 which is part of a trie structure and has two child nodes (N51 and N52). In this exemplary case, there are two pointers from each child node downward in the tree. As a first step, a node N60 as shown in FIG. 3 is formed from the quad node and its child nodes by means of level compression, the logical element table of the new node having 16 elements. In FIG. 2 the element table indices of node N50 are indicated above the corresponding elements, and in FIG. 3 the sets of four elements corresponding to said indices are indicated. The pointers A ... D of the child nodes will assume the locations shown in FIG. 3 (locations corresponding to logical indices 0, 1, 12 and 14).

After the level compression, a width compression is performed on node N60 by storing only non-nil pointers. In addition to the non-nil pointers, a bit pattern or chart is stored in connection with the trie node, on the basis of which it can be determined whether the pointer corresponding to the logical index of the element table of the node is a nil pointer or not, and if not, where the pointer corresponding to said logical index is physically located in the node. When compression is used, the standard-length element table (16 elements) of the node is represented by means of the bit pattern as a table of physical storage locations the length of which varies according to how many nil pointers the node contains in each case. It is to be noted, therefore, that in connection with the width compression the logical size of the node (i.e. the size of the element table) does not change, but the physical size of the node diminishes instead, since in a compressed node the nil pointers do not occupy any storage space.

In accordance with one embodiment of the invention, all non-nil pointers are stored in succession in the node in such a way that their relative order remains the same as in the element table, and a separate bit pattern is used to indicate the physical index (physical location) of each stored pointer.

The result is the compressed node N70 in accordance with FIG. 4, in which all non-nil pointers are in succession. The node contains only four physical elements (pointers A ... D), and in addition to these a bit pattern BP1 is stored in the node, indicating the physical location of the pointer corresponding to the element table index formed from the search key in the node. In this case, the bit pattern has one bit for each element (logical index) of the element table, and each bit indicates whether the corresponding element contains a non-nil pointer or a nil pointer. In the exemplary case shown in the figure, one denotes a non-nil pointer and zero denotes a nil pointer. Since the pointers are stored in the compressed node preserving the order (and no space is reserved for nil pointers), it is known for the compressed node of FIG. 4 that a non-nil pointer corresponds to element table index 0, its physical index being zero, and a non-nil pointer corresponds to element table index 1, its physical index being one, nil pointers correspond to element table indices 2 ... 11, a non-nil pointer corresponds to element table index 12, its physical index being two, a nil pointer corresponds to element table index 13, a non-nil pointer corresponds to element table index 14, its physical index being three, and a nil pointer corresponds to element table index 15. Thus, the pointer corresponding to the logical index formed from the search key bits is easily found in the node. Such a manner of compression, in which the bit pattern of the compressed node has one bit for each element (logical index) of the element table is known per se. Such a solution is referred to for example in U.S. Pat. No. 5,276,868.

Address computation for the compressed node is performed in such a way that a (logical) element table index is first formed from the (four) bits extracted from the search key in the normal way. Thereafter, the bit corresponding to this index is read from the bit pattern. If the bit indicates that a nil pointer is concerned, the search is terminated as unsuccessful. If the bit indicates that a non-nil pointer is concerned, the physical location (physical index) of the pointer corresponding to said element table index is determined by means of the bit pattern. When a bit pattern as indicated in FIG. 4 is used, having one bit for each index of the element table, the physical index is directly obtained by counting the number of 1-bits starting from the beginning of the bit pattern up to the bit corresponding to the element table index.

Thus, in this embodiment the bit pattern has 16 bits and the (physical) node has (16-P0) pointers, where P0 is the number of nil pointers in the (logical) element table of the node. However, the number of bits used in the bit pattern can deviate from the number of logical indices, and the bit pattern can employ various coding methods by means of which the physical storage location corresponding to the logical index is found. However, the solution disclosed above affords a short bit pattern and a simple coding mechanism.

Figure 5:
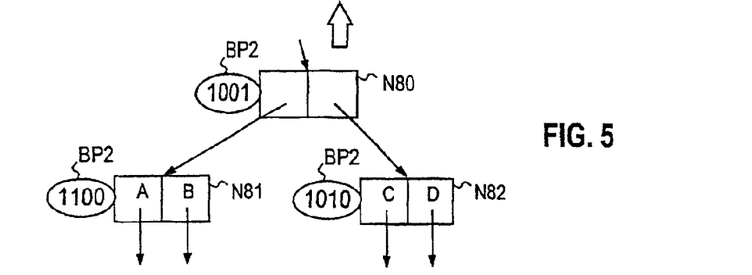
FIG. 5 shows the quad node group of FIG. 2 when width compression is additionally employed in the trie structure.

In addition to the compression method described above, a trie structure can also employ width compression that is directed to individual nodes. In such a case, the quad node has 4-P0 pointers and a bit pattern having four bits, for example, each bit indicating whether the corresponding element contains a nil pointer or a non-nil pointer. FIG. 5 shows a situation corresponding to that of FIG. 2 when all quad nodes are width-compressed quad nodes. In this case, the nodes are denoted with references N80 ... N82 and the four-bit bit pattern of each node with reference BP2. From the node group shown in FIG. 5, a compressed node N70 in accordance with FIG. 4 is formed. Quad nodes that are compressed by the method of the invention can thus be normal quad nodes or width-compressed quad nodes compressed e.g. in the manner shown in FIG. 5. The group to be compressed can also have nodes of both types. (The term quad node refers generally to a node whose logical element table has four elements.)

In practice, each of the nodes according to the example presented above requires a storage space of 5 words (nodes N50 ... N52) or 3 words (nodes N80 ... N82) (a word for each pointer and additionally one word carrying the type information for the node). Thus, the space requirement of the combination shown in FIG. 5 is 9 words. On the other hand, the space requirement of the compressed node N70 is 5 words (if the bit pattern can be accommodated in the word containing the type information). If for example a pointer is added to node N82, a total of 6 words is to be copied in the exemplary case of FIG. 8 (nodes N80 and N82). When the nodes are replaced with compressed node N70, 5 words are to be copied. Thus, in this exemplary case the compression has been carried out in such a way that the number of words to be copied in connection with updating has been reduced by one. Furthermore, the storage space requirement of the structure and the number of levels has been reduced. Compared to the initial situation shown in FIG. 2, the advantage gained is still greater.

Figure 6:
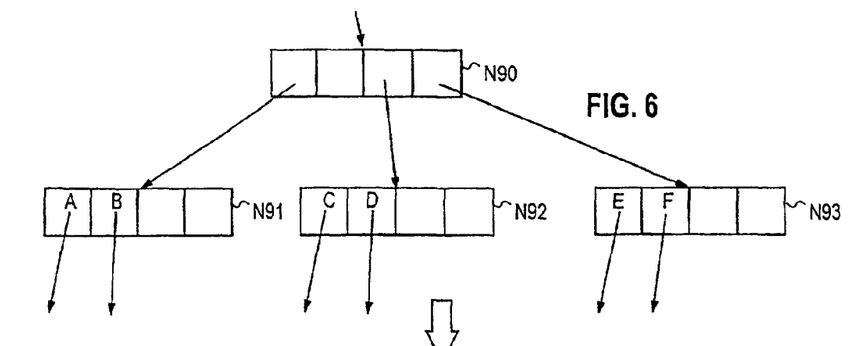
FIGS. 6 and 7 show a second compression example.
Figure 7:
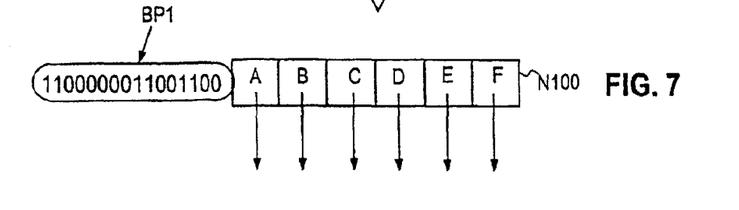

FIGS. 6 and 7 depict another exemplary case in which the (normal) quad node N90 of FIG. 6 has three (normal) child nodes from which there are 6 pointers in all (A . . . F) downward. When this combination is compressed in the manner described above, the result is a compressed node N100 as shown in FIG. 7.

In addition to the node type information, each normal quad node need only contain an element table (pointers). If no other compression methods are used, the type information indicates whether a normal quad node or a node compressed in accordance with the invention is concerned, and thus it is known whether the number of bits to be searched is two or four. If other compression methods (width and/or path compression) are additionally used, the type information will respectively indicate which node type is concerned. Furthermore, a compressed node always has the above bit pattern, which may also be included in non-compressed nodes, particularly if in practice the situation is such that the node has extra (unused) bits in place of which the bit pattern can be accommodated without increasing the storage space required by the node.

Figure 8:
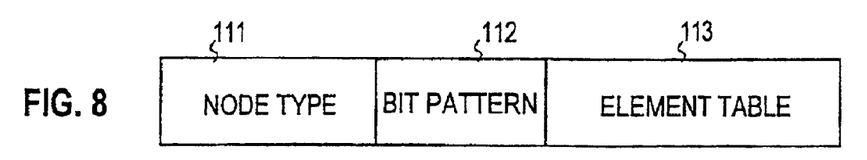
FIG. 8 illustrates the structure of a compressed trie node.

FIG. 8 shows the structure of a compressed quad node. In its minimum composition, the compressed node thus comprises three parts: a type information field indicating the type of the node (reference 111), field 112 containing the bit pattern, and an element table (reference 113) in which the number of elements (pointers) is in accordance with the above.

The type information for the node can also be stored in the pointer of the parent node if it has extra bits for this purpose. For example in a 32-bit architecture, the two "lowermost" bits of the pointer can be used to encode in the pointer for example information on whether a nil pointer (an empty element) is concerned or whether the pointer points to a normal trie node, a bucket, or a compressed trie node. In the case of a bucketless structure, information is stored in the memory on whether the pointer points to a non-compressed node, a compressed node or a data unit.

As was stated at the beginning, the compression principle described above also applies to a bucketless trie structure. In a bucketless structure, even greater benefit is gained with the solution in accordance with the invention than in a bucket structure. This is due to the fact that the fill rates of the nodes are usually higher at the upper end of the trie tree than at the lower end of the trie tree. By means of the buckets, nodes at the lower end of the trie tree can be combined, and thus a bucketless structure normally has more nodes in which the number of empty elements is greater than at the upper end of the trie. (In a bucketless structure a leaf node, typically containing a pointer to a data unit or a data unit, corresponds to the bucket.)

In order that the number of words to be copied in connection with updates may not become too high and thereby impair the benefit to be obtained from compression, it is preferable to set a predetermined maximum capacity (maximum number of pointers) for the compressed node. This number can be for example eight or ten. If insertions are made to the structure, so that the number of pointers in the compressed node will exceed the chosen maximum capacity, the compressed node is reduced to quad nodes at two different levels (FIGS. 2, 5 and 6). The reducing operation is reverse to compression.

On account of the foregoing, the compression method can only be applied to such groups of nodes that meet a predetermined compression condition, set so as to afford maximum benefit from the method. The compression can, for example, only be performed on node groups in which a quad node has two child nodes (the maximum number of grandchild nodes being eight), at least one of which shall be a normal trie node (cf. FIG. 2) or, in the case of a bucketless structure, an internal node. Alternatively, the method can be applied to all such node groups in which a quad node has a maximum of eight grandchild nodes (cf. FIG. 6). The first alternative has the advantage that the number of grandchild nodes need not be studied, whereas the second alternative has the advantage of broader application, i.e. even in quad nodes having three or four child nodes. One way is to define the limits of the number of pointers in such a way that the compression limit is smaller than the limit for undoing the compression, for example in such a way that compression is carried out on quad nodes having eight grandchild nodes at most, but decompression is performed only when the number of pointers in the compressed node exceeds ten. In this way, it is achieved that the decompression need never be carried out immediately after compression in connection with the next update.

It is also preferable to incorporate in the memory in accordance with the invention the path compression to which reference was briefly made in the above. The path compression can be implemented by a method known per se, for example in the way disclosed in the Applicants' earlier application PCT/FI98/00191. In the method described in this publication, the path compression is carried out by replacing groups of successive quad nodes with compressed nodes in such a way that an individual group constituted by successive nodes, each of which contains only one pointer to a quad node at a lower level, is replaced by a compressed node storing the address of the quad node to which the lowest node in the group to be replaced points. Furthermore, the node stores information on the value of the search word by which said address is found as well as information on the total number of bits wherefrom the search words are formed in the group to be replaced. If path compression is used in the trie structure, at least one of the child nodes must be an internal node whose path has not been compressed in order for the compression in accordance with the invention to be possible. Since path compression can be carried out by known methods, it will not be described in detail in this context.

A unidimensional search structure can be made multidimensional (generally n-dimensional) in the known manner by employing bit interleaving. Bit interleaving has been disclosed for example in the above international application PCT/FI98/00191, wherefrom the interested reader can find background information relating to the invention, if desired.

Figure 9:
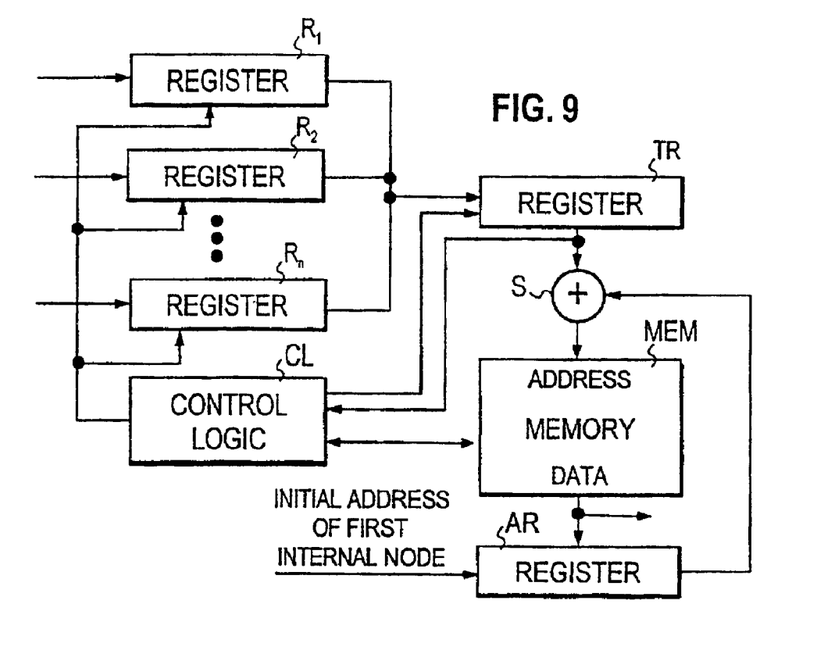
FIG. 9 shows a block diagram of a memory arrangement in accordance with the invention.

FIG. 9 shows a block diagram of a memory in accordance with the invention. Each dimension has a dedicated input register, and hence there is a total of n input registers. The search key of each dimension is stored in these input registers, denoted by references $R_1 \ldots R_n$, each key in a register of its own. The input registers are connected to a register TR in which the above-described search word is formed in accordance with the bit interleaving method employed. The register TR is connected via adder S to the address input of memory MEM. The output of the memory in turn is connected to address register AR the output of which in turn is connected to adder S. Initially, the bits selected from each register are read into the common register TR in the correct order. The initial address of the first trie node is first stored in the address register AR, and the address obtained as an offset address from register TR is added to the initial address in adder S. The resulting address is supplied to the address input of the memory MEM, and the data output of the memory provides the initial address of the next trie node, the address being written into the address register AR over the previous address stored therein. Thereafter the next selected bits are again loaded from the input registers into the common register TR in the correct order, and the table address thus obtained is added to the initial address of the relevant table (i.e., trie node), obtained from the address register AR. This address is again supplied to the address input of the memory MEM, the data output of the memory thus providing the initial address of the next node. The above-described procedure is repeated until the desired point has been accessed and recordal can be performed or the desired record read.

Control logic CL attends to the fact that for a compressed node, the address of the correct node is obtained from the data output. When a compressed node is concerned, the control logic reads the bit corresponding to the element table index from the bit pattern of the node. If said bit indicates that a non-nil pointer is concerned, the control logic determines the physical index on the basis of the bit pattern and stores it in register TR instead of the logical index. In such a case, the physical index is added (instead of the logical index) in adder S with the initial address of the node that is obtained from register AR. The control logic also attends to the compression of the nodes and to the fact that a correct number of bits (2 or 4) is extracted from the registers in each node.

The rapidity of the address computation can be influenced by the type of hardware configuration chosen. Since progress is by way of the above-stated bit manipulations, address computation can be accelerated by shifting from use of one processor to a multiprocessor environment in which parallel processing is carried out. An alternative implementation to the multiprocessor environment is an ASIC circuit.

On account of the solution in accordance with the invention, an amount of storage space corresponding to a few data words is typically saved for each quad node group (a word typically contains 32 bits). In practice, no additional space is usually required for the bit pattern, since as a rule the node includes data fields that do not occupy an entire word length (storage space is reserved in lengths of one word at a time), e.g. the field containing the type information. Furthermore, the number of levels is locally reduced by one, and at best the depth of the entire trie tree is reduced to half. At the same time, the number of words to be copied in connection with updates can be made smaller.

Even though the invention has been described in the above with reference to examples in accordance with the accompanying drawings, it is obvious that the invention is not to be so restricted, but it can be modified within the scope of the inventive idea disclosed in the appended claims. Compression can be carried out for example in only part of the memory, e.g. on internal nodes only. Also, address computation can continue in the bucket, provided that unsearched bits still remain. Hence, the definition of a bucket given at the beginning is to be broadened in such a way that a bucket is a data structure that can also comprise another trie structure. Thus, several directory structures in accordance with the present invention can be linked in succession in such a way that another directory structure (that is, another trie structure) is stored in a bucket, or a pointer contained in a bucket points to another directory structure. Reference from a bucket is made directly to the root node of the next directory structure. Reference can also be made from a leaf node to the root node of the next directory structure. Generally, it may be stated that a bucket contains at least one element so that the type of an individual element is selected from a group comprising a data unit, a pointer to a stored data unit, a pointer to another directory structure, and another directory structure. The detailed implementation of buckets is dependent on the application. In most cases, all elements in the buckets are of the same type, being either a data unit or a pointer to a data unit. The different types of elements in the leaf or bucket may also include additional information, e.g. elements of the type "pointer to a data unit" or "data unit" may have an associated search key, as stated above. In applications in which character strings are stored in the memory, the bucket may also contain element pairs e.g. in such a way that all pairs in the bucket are either pointer to data unit/pointer to directory structure pairs or data unit/pointer to directory structure pairs or data unit/directory structure pairs. In such a case, for example, the prefix of the character string may be stored in the data unit and the search may be continued in the directory structure that is the pair of the data unit.

What is claimed is:

1. A method for implementing a functional memory, wherein memory data is stored as data units for each of which a dedicated storage space is assigned in the memory, the method comprising:

implementing a memory as a directory structure comprising a tree-shaped hierarchy having nodes at several different levels, wherein an individual node includes (i) a trie node associated with a logical table wherein an individual element contains a pointer pointing to a lower node in the tree-shaped hierarchy, a number of elements in the logical table corresponding to a power of two, or (ii) a bucket containing at least one element wherein a type of said individual element in the bucket is selected from a group including a data unit, a pointer to a stored data unit, a pointer to another directory structure and said another directory structure;

performing address computation in the directory structure by
(a) selecting in the node at an uppermost level of the tree-shaped hierarchy a given number of bits from a bit string formed by employed search keys, forming from the given number of bits a search word for seeking an address of a next node in the individual node, and proceeding to said next node,
(b) selecting a predetermined number of bits from unselected bits in the bit string formed by the employed search keys and forming from the predetermined number of bits another search word for seeking another address of a further new node at a lower level from the logical table of the individual node that has been accessed, repeating step (b) until an element containing a nil pointer is encountered or until the address of the new node at said lower level is the address of said bucket, wherein the nodes to which a given node contains pointers are child nodes of said given node and the nodes to which the child nodes contain pointers are grandchild nodes of said given node; and implementing trie nodes as quad nodes of four elements, and replacing in at least part of the directory structure groups of successive nodes by compressed nodes by
(a) replacing an individual group comprising a given quad node and its child nodes by a node whose logical table has 16 elements, and
(b) forming a compressed node known per se from said node of 16 elements by physically storing in the compressed node non-nil pointers and a bit pattern on a basis of which a physical storage location in the compressed node, corresponding to the search word, is determined.

2. A method as claimed in claim 1, further comprising performing replacement in the directory structure on all groups in which the quad node has two child nodes.

3. A method as claimed in claim 1, further comprising performing replacement in the directory structure on all groups in which the quad node has up to eight grandchild nodes.

4. A method as claimed in claim 2, further comprising setting an upper limit for the number of pointers in the compressed node, wherein when said limit is exceeded, the compressed node is decompressed to another quad node and child nodes.

5. A method as claimed in claim 4, further comprising evolving eight pointers said upper limit.

6. A method as claimed in claim 4, further comprising employing ten pointers as said upper limit.

7. A method as claimed in claim 2, further comprising performing compression on at least some of the quad nodes in the structure so that non-nil pointers are physically stored in the node and a bit pattern on a basis of which the physical storage location in the node, corresponding to the search word, is determined.

8. A method as claimed in claim 1, further comprising storing the non-nil pointers in the compressed node in a same order that the non-nil pointers have in said logical table.

9. A method as claimed in claim 8, wherein the bit pattern has one bit for each element in the table, said one bit indicating whether the corresponding element contains a nil pointer or a non-nil pointer.

10. A method as claimed in claim 8, further comprising reserving space for the bit pattern in said trie nodes of the directory structure.

11. A method as claimed in claim 8, further comprising reserving space for the bit pattern in the compressed nodes.

12. A method as claimed in claim 1, further comprising determining said individual element is empty, wherein a content of the individual element corresponds to said nil pointer.

13. A method for implementing a functional memory, wherein memory data is stored as data units for each of which a dedicated storage space is assigned in the memory, the method comprising:

implementing the memory as a directory structure comprising a tree-shaped hierarchy having nodes at several different hierarchy levels, wherein an individual node includes (i) an internal node associated with a logical table wherein an individual element contains a pointer pointing to a lower node in the tree-shaped hierarchy and a number of elements in the logical table corresponding to a power of two, or (ii) a leaf containing an element of a type is selected from a group including a pointer to a stored data unit, a data unit, and a pointer to a node in another directory structure;

performing address computation performed in the directory structure by (a) selecting in the individual node at an uppermost level of the tree-shaped hierarchy a given number of bits from a bit string formed by the employed search keys, forming from the given number of bits a search word to seek an address of a next node in the individual node, and proceeding to said next node;

(b) selecting another given number of bits from the-unselected bits in the bit string formed by the employed search keys, and forming from the another given number of bits another search word to seek another address of a further new node at a lower level from the logical table of the individual node that has been accessed, and repeating step (b) until an empty element is encountered or until the address of the new node at a lower level is the address of the leaf, wherein the nodes to which a given node includes pointers are child nodes of said given node and the nodes to which the child nodes contain pointers are grandchild nodes of said given node; and implementing internal nodes as quad nodes having four elements, and replacing, in at least part of the directory structures groups of successive nodes by compressed nodes by replacing an individual group comprising a given quad node and its child nodes by a node whose node logical table has 16 elements, and forming a compressed node known per se from said node of 16 elements by physically storing in the compressed node non-nil pointers and a bit pattern on a basis of which a physical storage location in the compressed node, corresponding to the search word, is determined.

14. A method as claimed in claim 13, further comprising performing replacement in the directory structure on all groups in which the quad node has two child nodes.

15. A method as claimed in claim 13, further comprising performing replacement in the directory structure on all groups in which the quad node has up to eight grandchild nodes.

16. A method as claimed in claim 14, further comprising setting an upper limit for a number of pointers in the compressed node, wherein when said upper limit is exceeded, the compressed node is decompressed to a quad node and child nodes.

17. A method as claimed in claim 16, further comprising employing eight pointers as said upper limit.

18. A method as claimed in claim 16, further comprising employing ten pointers as said upper limit.

19. A method as claimed in claim 14, further comprising performing compression on at least some of the quad nodes in the structure so that the non-nil pointers are physically stored in the compressed node and a bit pattern on a basis of which the physical storage location in the node, corresponding to the search word, is determined.

20. A method as claimed in claim 13, further comprising storing the non-nil pointers in the compressed node in a same order as in said node logical table.

21. A method as claimed in claim 20, wherein the bit pattern has one bit for each element in the node logical table, each bit indicating whether the each element contains a nil pointer or a non-nil pointer.

22. A method as claimed in claim 20, further comprising reserving space for the bit pattern in all trie nodes of the directory structure.

23. A method as claimed in claim 20, further comprising reserving space for the bit pattern in the compressed nodes.

24. A method as claimed in claim 13, further comprising determining said individual element is empty, wherein a content of the individual node corresponds to said nil pointer.

25. A memory arrangement for storing data units, said memory arrangement comprising:

a directory structure wherein progress is made by using search words formed from a bit string constituted by search keys employed in each case, said directory structure comprising a tree-shaped hierarchy having nodes at several different hierarchy levels, wherein an individual node is (i) a trie node associated with a logical table wherein an individual element contains a pointer pointing to a lower node in the tree-shaped hierarchy, a number of elements in the logical table corresponding to a power of two, or (ii) a bucket containing at least one element so that a type of an individual element in the bucket is selected from a group including a data unit, a pointer to a stored data unit, a pointer to a node in another directory structure, and said another directory structure, wherein some of the trie nodes are quad nodes having a node logical table that includes four elements and some of the trie nodes are nodes having a node logical table that includes 16 elements and wherein non-nil pointers are physically stored in addition to a bit pattern on a basis of which a physical storage location in the node, corresponding to the search word, is determined.

26. A memory arrangement as claimed in claim 25, wherein at least some of said quad nodes store physically those pointers that are non-nil pointers and a bit pattern on the basis of which the physical storage location in the node, corresponding to the search word, is determined.

27. A memory arrangement as claimed in claim 25, wherein said individual element is empty and a content of said individual element corresponds to a nil pointer.

28. A memory arrangement for storing data units, said memory arrangement comprising:

a directory structure wherein progress is made by using search words formed from a bit string constituted by search keys employed in each case, said directory structure comprising a tree-shaped hierarchy having nodes at several different hierarchy levels, wherein an individual node is (i) an internal node associated with a logical table wherein an individual element contains a pointer pointing to a lower node in the tree-shaped hierarchy, a the number of elements in the logical table corresponding to a power of two, or (ii) a leaf containing at least one element of a type selected from a group including a pointer to a stored data unit and a pointer to a node in another directory structure, wherein some of the trie nodes are quad nodes having a node logical table including four elements and some of the trie nodes are nodes having a node logical table that includes 16 elements and wherein non-nil pointers are physically stored in addition to a bit pattern on a basis of which a physical storage location in the node, corresponding to the search word, is determined.

29. A method-memory arrangement as claimed in claim 28, wherein at least some of said quad nodes store physically those pointers that are non-nil pointers and a bit pattern on the basis of which the physical storage location in the node, corresponding to the search word, is determined.

30. A memory arrangement as claimed in claim 28, wherein said individual element is empty and a content of said individual element corresponds to nil pointer.

* * * * *